(12) United States Patent
Shibuya

(10) Patent No.: US 10,949,145 B2
(45) Date of Patent: Mar. 16, 2021

(54) IMAGE FORMATION APPARATUS HAVING READING ERROR AND REGENERATING IMAGE DATA, CONTROL METHOD OF IMAGE FORMATION APPARATUS, AND STORAGE MEDIUM

(71) Applicant: CANON KABUSHIKI KAISHA, Tokyo (JP)

(72) Inventor: Yuichiro Shibuya, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/434,703

(22) Filed: Jun. 7, 2019

(65) Prior Publication Data

US 2019/0377524 A1 Dec. 12, 2019

(30) Foreign Application Priority Data

Jun. 11, 2018 (JP) .............................. JP2018-110880

(51) Int. Cl.
*G06F 3/12* (2006.01)
*H04N 1/00* (2006.01)

(52) U.S. Cl.
CPC .......... *G06F 3/1234* (2013.01); *G06F 3/1204* (2013.01); *G06F 3/1248* (2013.01); *H04N 1/00193* (2013.01); *H04N 1/00965* (2013.01)

(58) Field of Classification Search
CPC ............................ G06F 3/1234; G06F 3/1204
See application file for complete search history.

(56) References Cited

U.S. PATENT DOCUMENTS

| | | | | |
|---|---|---|---|---|
| 5,592,683 | A * | 1/1997 | Chen ......................... | G06F 3/12 382/309 |
| 2002/0041384 | A1* | 4/2002 | Moriura ................. | H04N 1/506 358/1.9 |
| 2009/0316171 | A1* | 12/2009 | Kurihara ............... | G06F 3/1244 358/1.9 |
| 2010/0180149 | A1* | 7/2010 | Brondijk ................ | G11B 19/04 714/5.1 |

FOREIGN PATENT DOCUMENTS

JP H10-13593 A 1/1998

* cited by examiner

*Primary Examiner* — Ibrahim Siddo
(74) *Attorney, Agent, or Firm* — Canon U.S.A., Inc. IP Division

(57) ABSTRACT

When a reading error occurs while reading out image data saved in a hard disk, input data which is saved in a RAM is read out and image data is regenerated from the read input data. This enables reprinting by an image formation apparatus alone without requiring a user to re-input image data even when the reading of data occurs due to abnormality of the hard disk.

11 Claims, 11 Drawing Sheets

IMAGE FORMATION APPARATUS HAVING READING ERROR AND REGENERATING IMAGE DATA, CONTROL METHOD OF IMAGE FORMATION APPARATUS, AND STORAGE MEDIUM

BACKGROUND

Field

One disclosed aspect of the embodiments relates to an image formation apparatus, and particularly to an image formation apparatus equipped with a hard disk for recording image data.

Description of the Related Art

Conventionally, some image formation apparatuses are equipped with a hard disk as a storage device that retains image data and application data, which are input by a user, and temporary data being processed.

A hard disk may have a defective media region (hereinafter, referred to as a "bad sector") where reading and writing of data is disabled when, for example, a main power supply is shut off (for example, power failure occurs) while data is being written.

If reading of data is performed with a bad sector being left as-is, a reading process of data recorded in a portion corresponding to the bad sector will not be normally completed, resulting in a data reading error.

Japanese Patent Application Laid-Open No. H10-13593 discloses a technique to continue copy operation by instructing a user to re-input image data to cope with a situation in which a reading error has occurred while image data saved in a hard disk is being read out.

However, in an image formation apparatus disclosed by Japanese Patent Application Laid-Open No. H10-13593, data needed for printing is not retained in the image formation apparatus excepting on a hard disk. Therefore, it is necessary to require a user to re-input the image data when an error in reading data from the hard disk has occurred, such as when a bad sector has occurred in the hard disk.

SUMMARY

In view of such an issue, the disclosure has an aspect of enabling reprinting by an image formation apparatus alone without requiring a user to enter image data over again.

One disclosed aspect of the embodiments in an image formation apparatus, includes a first storage unit, a generation unit, a second storage unit, a reading unit, and a print unit. The first storage unit is configured to temporarily save input data. The generation unit is configured to generate image data from the input data. The second storage unit is configured to save the image data. The reading unit is configured to read out the image data from the second storage unit. The print unit is configured to print the image data. The image formation apparatus further comprises a determination unit configured to determine whether or not a reading error of the image data has occurred when the reading unit reads out the image data from the second storage unit. In a case where the determination unit determines that the reading error has occurred, the reading unit is configured to read out the input data from the first storage unit, and the generation unit is configured to regenerate image data from the input data which has been read out from the first storage unit.

According to the disclosure, reprinting is enabled by an image formation apparatus alone without requiring a user to re-input image data even when an error in reading data has occurred due to an abnormality of the hard disk.

Further features of the disclosure will become apparent from the following description of exemplary embodiments with reference to the attached drawings.

DESCRIPTION OF THE EMBODIMENTS

Preferred embodiments will now be described in detail in accordance with the accompanying drawings.

Figure 1:
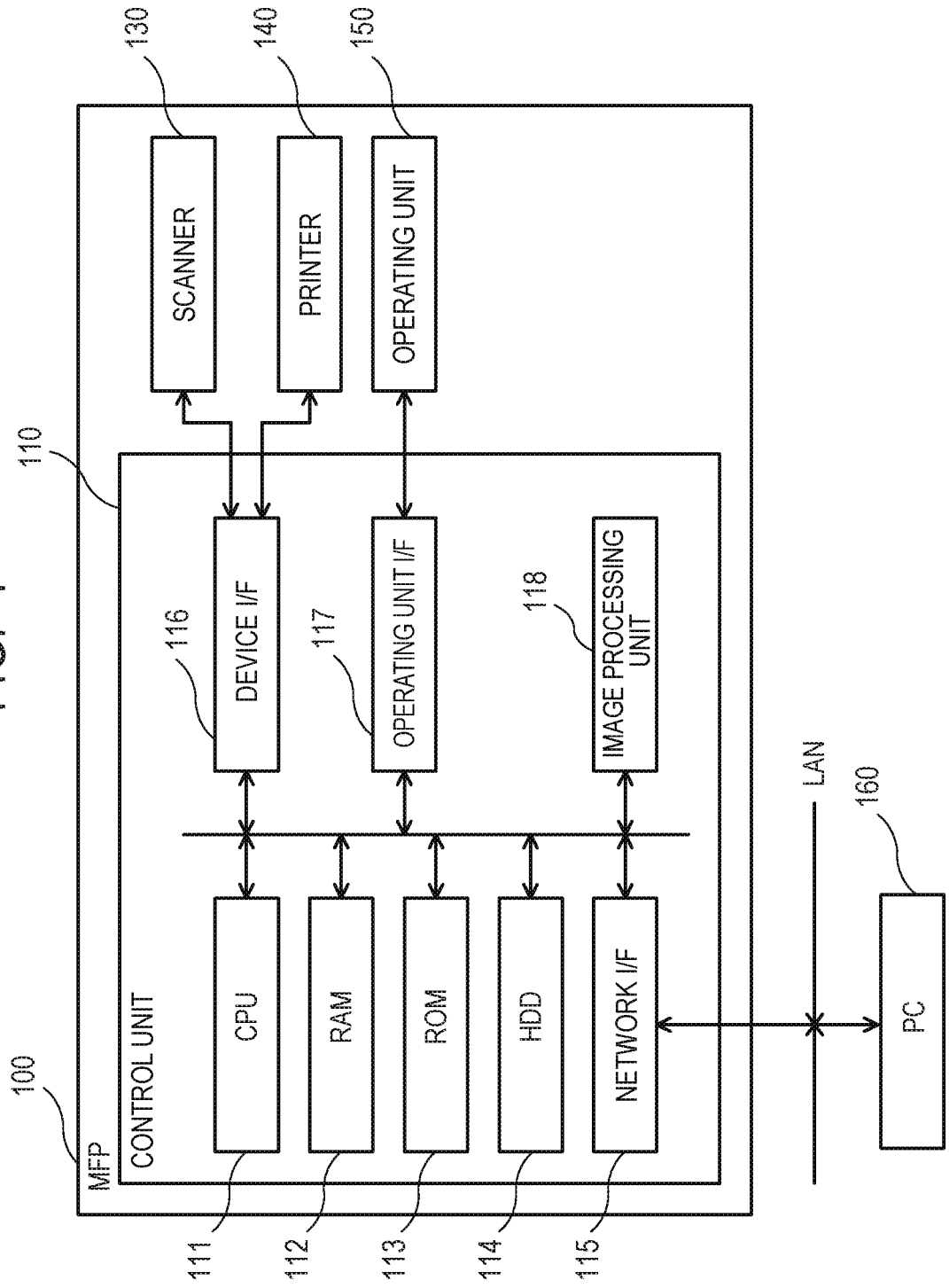
FIG. 1 is a block diagram illustrating a hardware configuration of an image formation apparatus.

FIG. 1 is a block diagram illustrating a hardware configuration of a multifunction peripheral (MFP) 100 which is an example of the image formation apparatus.

A control unit 110 is connected to a scanner 130 which is an image input device and a printer 140 which is an image output device, and controls input/output of image data. Further, the control unit 110 is connected to a Local Area Network (LAN) and, through which, performs reception of input data such as print job data input from an external apparatus such as a Personal Computer (PC) 160, and others.

A Central Processing Unit (CPU) 111, which is for controlling the operation of the MFP 100, performs the control based on a program 300 stored in a Read-Only Memory (ROM) 113.

Figure 3:
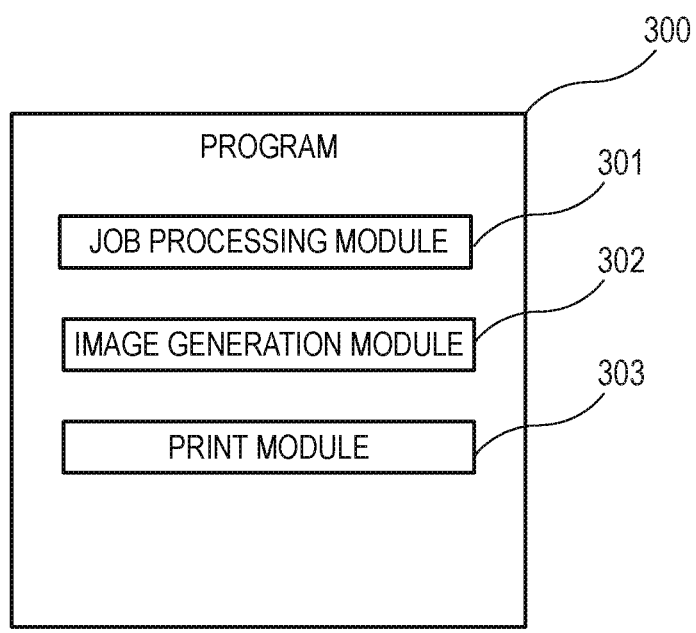
FIG. 3 is a block diagram illustrating a module configuration of programs for controlling the operation of an image formation apparatus.

The ROM 113 stores the program 300 for controlling the operation of the MFP 100 as described above. The program 300 stores a job processing module 301, an image generation module 302, a print module 303, and the like as illustrated in FIG. 3.

A Random Access Memory (RAM) 112 is a memory for temporarily storing image data which is input by a user and to be processed by an image processing unit 118, and the like.

A Hard Disk Drive (HDD) 114 is a hard disk drive for storing image data and the like.

To access a storage device such as a hard disk, the MFP 100 of the present embodiment uses a file system (see FIG.

4) which allows image data in the storage device to be handled as per file basis. The file system can accept an instruction from an application, and according to the content of the instruction, designate a file name with a file path, open the file, write data into the file, and read the data in the file.

Figure 4:
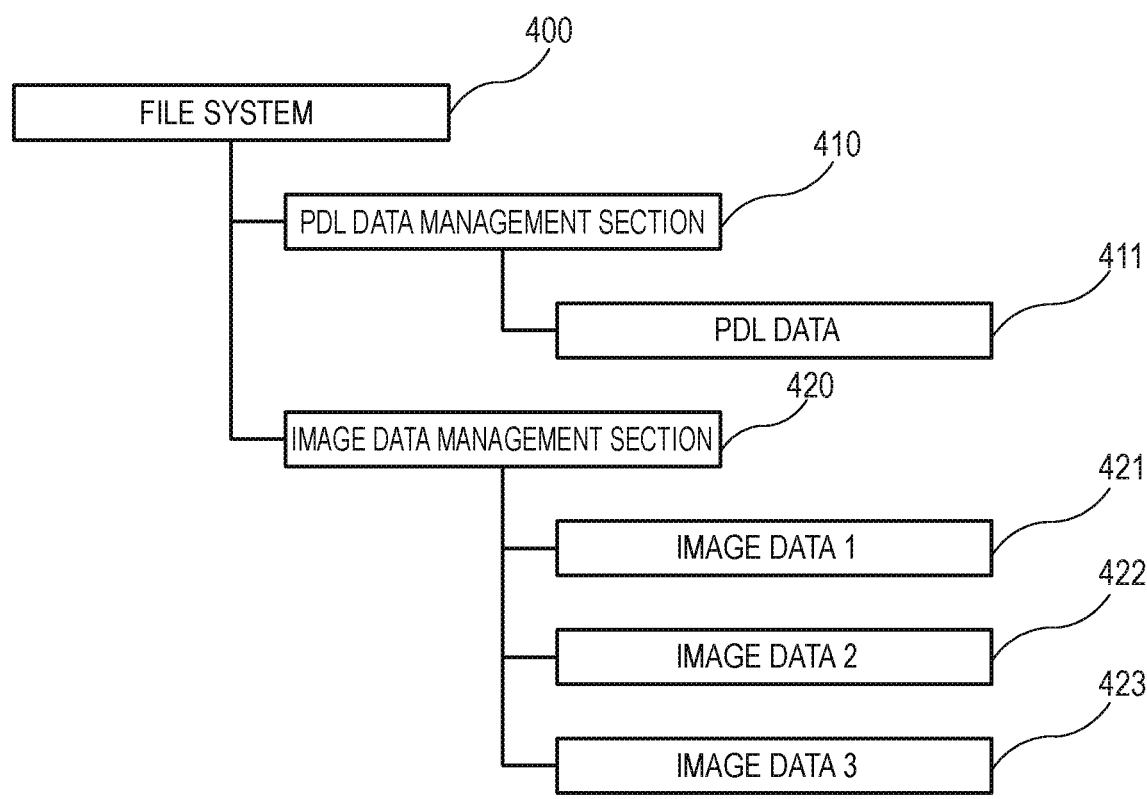
FIG. 4 is a diagram illustrating the configuration of a file system to be recorded in a hard disk of an image formation apparatus.

A file system 400 to be saved in the HDD 114 includes a Page Description Language (PDL) data management section 410 for storing PDL data and an image data management section 420 for storing image files, as different file paths as illustrated in FIG. 4.

The PDL data management section 410 stores PDL data 411.

Further, the image data management section 420 stores image data 421 to 423 for each page of original documents.

The program stored in the HDD 114 is loaded on the RAM 112, and the CPU 111 controls the operation of the MFP 100 based thereon. The RAM 112 stores a program or instructions that, when executed by the CPU 111, cause the CPU 11 to perform operations or to function as various units, as described in the following. A network Interface (I/F) 115 is connected to the LAN and communicates with external apparatuses such as the PC 160 via the network to control input/output of various information.

A device I/F 116 is an interface for connecting the scanner 130 and the printer 140, which are image input/output devices, with the control unit 110, and performs synchronous/nonsynchronous conversion of image data.

An operating unit I/F 117, which is an interface that connects an operating unit 150 with the control unit 110, outputs image data to be displayed on the operating unit 150 to the operating unit 150. Moreover, the operating unit I/F 117 transfers information input from the operating unit 150 by a user to the CPU 111.

The image processing unit 118 performs an image process on the input data received via the LAN, and on the image data input/output from and to the device I/F 116.

Figure 2:
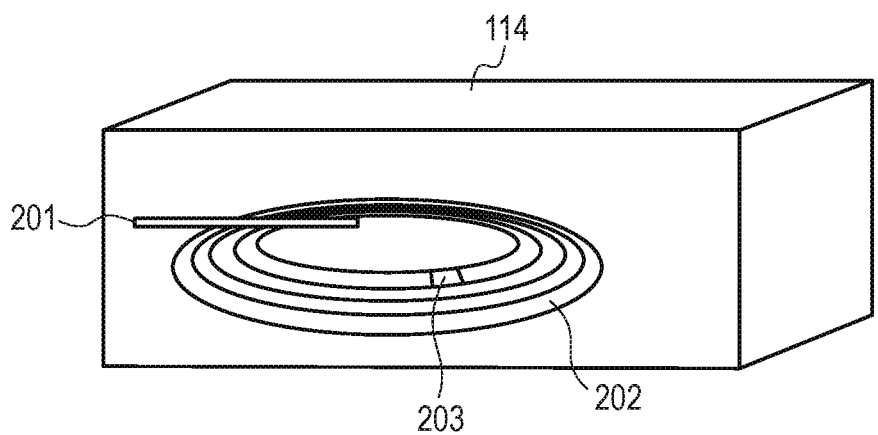
FIG. 2 is a diagram to illustrate an outline of the structure of a hard disk.

FIG. 2 is a diagram to illustrate an outline of the structure of the HDD 114 equipped in the MFP 100.

The HDD 114 is a magnetic storage device including a magnetic head 201 and a magnetic disk 202, in which recorded data is read by moving the magnetic head 201 to a sector 203 of the magnetic disk 202.

In that occasion, the sector 203 may fall into an abnormal state caused by that a sector 203 which is to be the target of reading/writing is deviated with respect to the magnetic head 203 due to vibration from the outside, and environments of temperature/humidity. Moreover, an abnormal state may also occur caused by that writing into the sector 203 is not normally completed due to abrupt shut down of power supply during writing of data.

When the sector 203 has fallen into an abnormal state, reading errors tend to occur when a particular file associated therewith is read out. Note that a sector which has fallen into such an abnormal state is called as a bad sector.

The image data which is utilized in the image formation apparatus is saved in each sector 203 of the HDD 114 as the image data 421 to 423 in the file system 400 as illustrated in FIG. 4 and is read out therefrom. However, if image data is recorded in a bad sector, the image data cannot be read out as normal image data.

Note that since in a semiconductor storage device such as a RAM, abnormality due to vibration or the like from the outside is not likely to occur, abnormality in reading data is less likely to occur compared to in a hard disk.

First Embodiment

Figure 6:
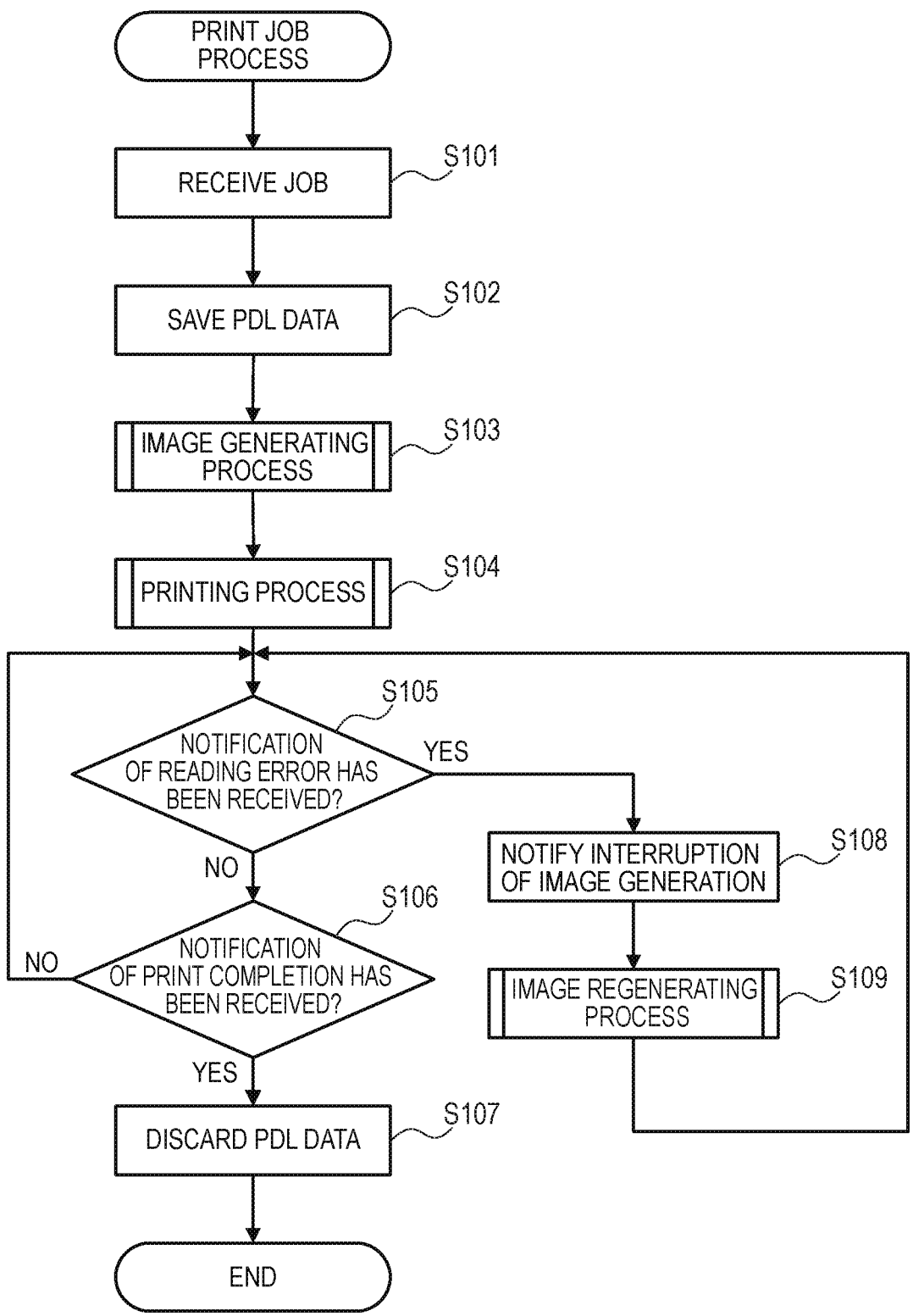
FIG. 6 is a flowchart to illustrate a flow of a print job process according to a first embodiment.

FIG. 6 is a flowchart to illustrate a flow of a print job process in an image formation apparatus according to a first embodiment.

Each process or operation in this flowchart is implemented by the CPU 111 executing the job processing module 301 in the program 300 stored in the ROM 113.

Figure 5:
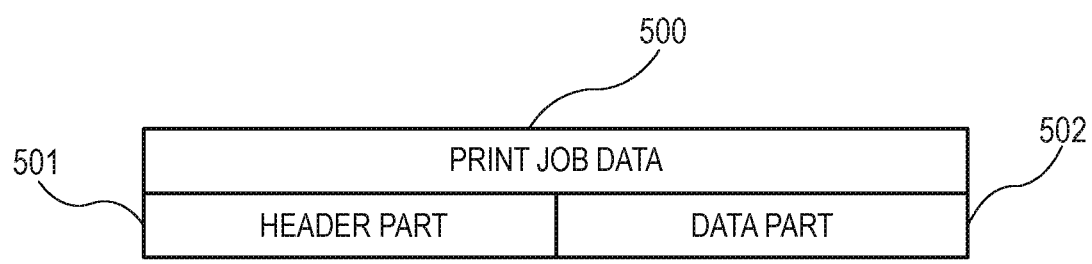
FIG. 5 is a diagram illustrating the configuration of print job data to be input to an image formation apparatus.

First, in S101, upon receiving print job data 500 which is input data input from the PC 160 via the network I/F 115, the CPU 111 saves the print job data 500 in the RAM 112. Here, the print job data 500 includes a header part 501 and a data part 502 as illustrated in FIG. 5.

Then, after saving the print job data 500 in the RAM 112, the CPU 111 analyzes the header part 501 of the print job data 500 to acquire a set value of print job and save it in the RAM 112. Note that the print job data 500 which is input data saved in the RAM 112 is temporarily saved until the print job is completed and is discarded when the print job is completed.

Next, in S102, the CPU 111 saves PDL data, which is in the data part 502 of the print job data 500 saved in the RAM 112, in the HDD 114 as the file system 400 stored in the PDL data management section 410.

Figure 7:
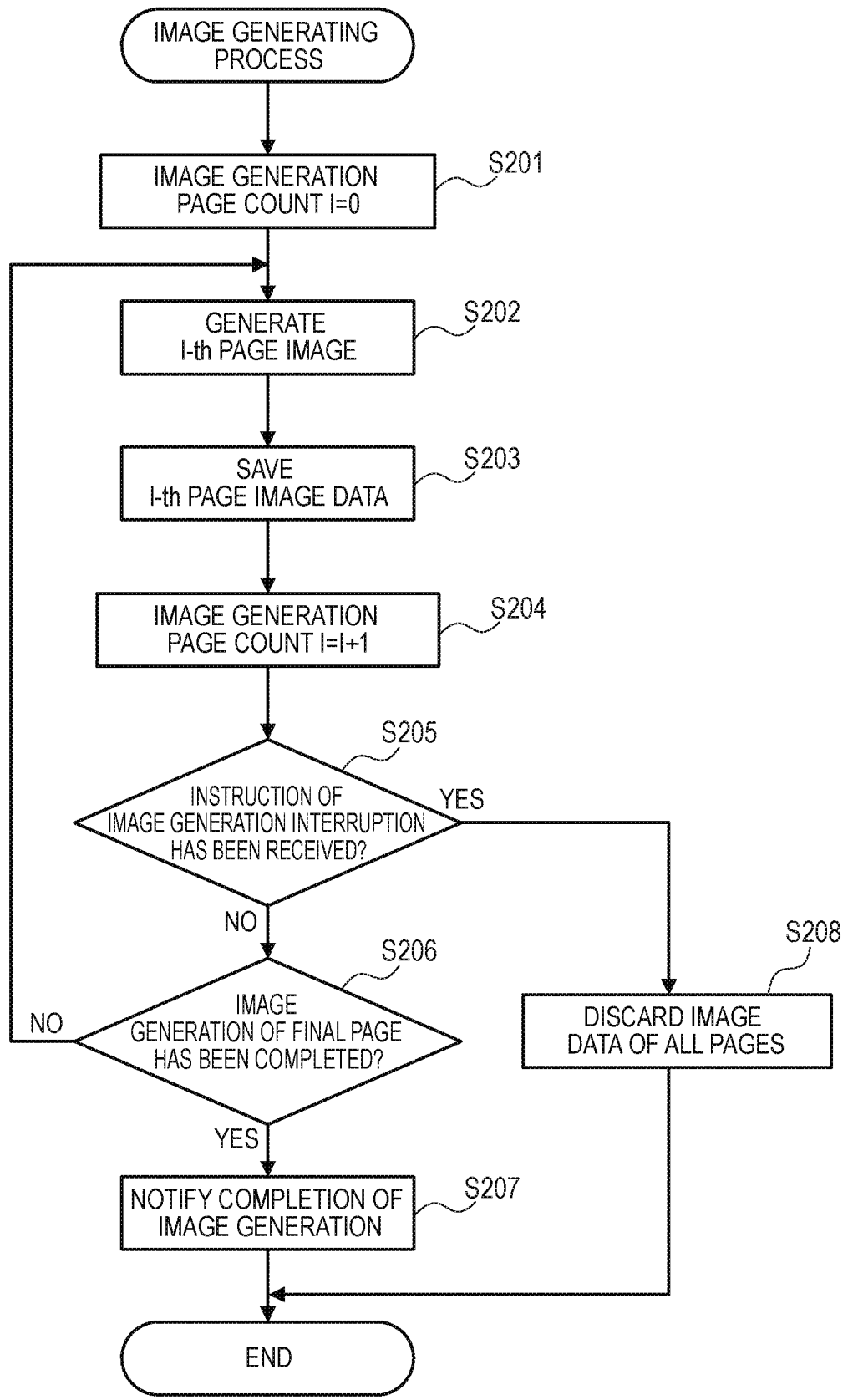
FIG. 7 is a flowchart to illustrate a detailed flow of an image generating process.

Then, in S103, the CPU 111 notifies start of image generation to the image generation module 302 in the program 300 and starts an image generating process. Note that details of the image generating process will be described in the flowchart of FIG. 7 described below. The print job process illustrated in FIG. 6 and the image generating process illustrated in FIG. 7 are performed in parallel.

Figure 9:
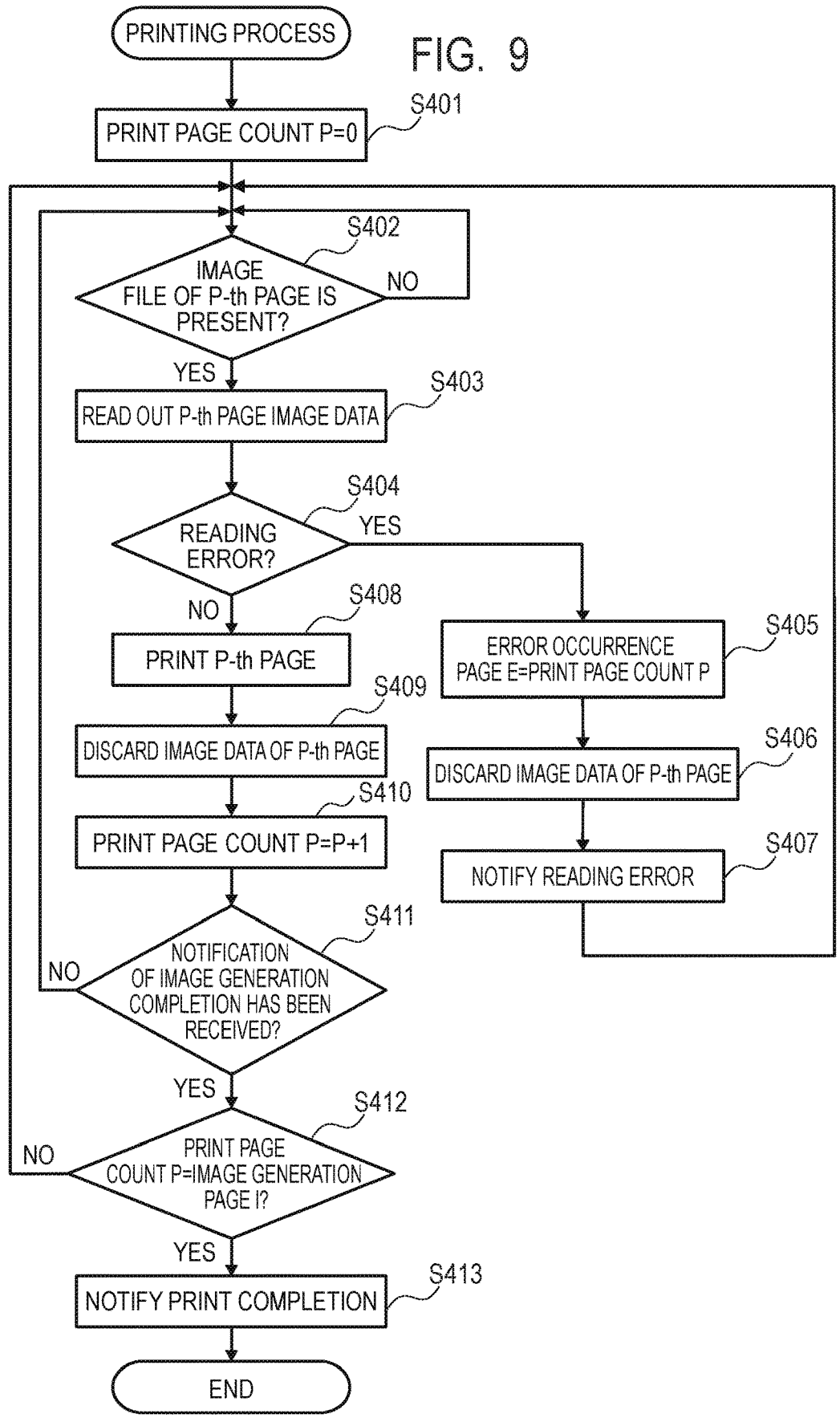
FIG. 9 is a flowchart to illustrate a detailed flow of a printing process.

Next, in S104, the CPU 111 notifies start of printing to a print module 303 in the program 300 and starts a printing process. Note that details of the printing process will be described in the flowchart of FIG. 9 described below. The printing process illustrated in FIG. 9 is performed further in parallel with the print job process illustrated in FIG. 6 and the image generating process illustrated in FIG. 7.

Then, in S105, the CPU 111 determines whether or not notification of reading error in S407 described below has been received.

As will be described below, notification of reading error is made when there is image data which has not been normally read out because it is recorded in a bad sector of the HDD 114.

When the notification of reading error has been received, the process proceeds to S108.

When the notification of reading error has not been received, the process proceeds to S106.

When the notification of reading error has not been received, in S106, the CPU 111 determines whether or not notification of print completion by S413 described below has been received.

When the notification of print completion has been received, the process proceeds to S107.

When the notification of print completion has not been received, the process returns to S105. Note that S105 and S106 are repeated until reading error notification or notification of print completion is received by S407 or S413 of FIG. 9 described later.

Upon receiving notification of print completion, in S107, the CPU 111 discards the PDL data 411 saved in the PDL data management section 410 on the file system 400 which is accessible to the HDD 114.

Then, the flowchart ends.

When notification of reading error is received in S105, in S108, the image generating process is interrupted. Specifically, the CPU 111 notifies interruption of image generation to the image generation module 302 in the program 300.

Figure 8:
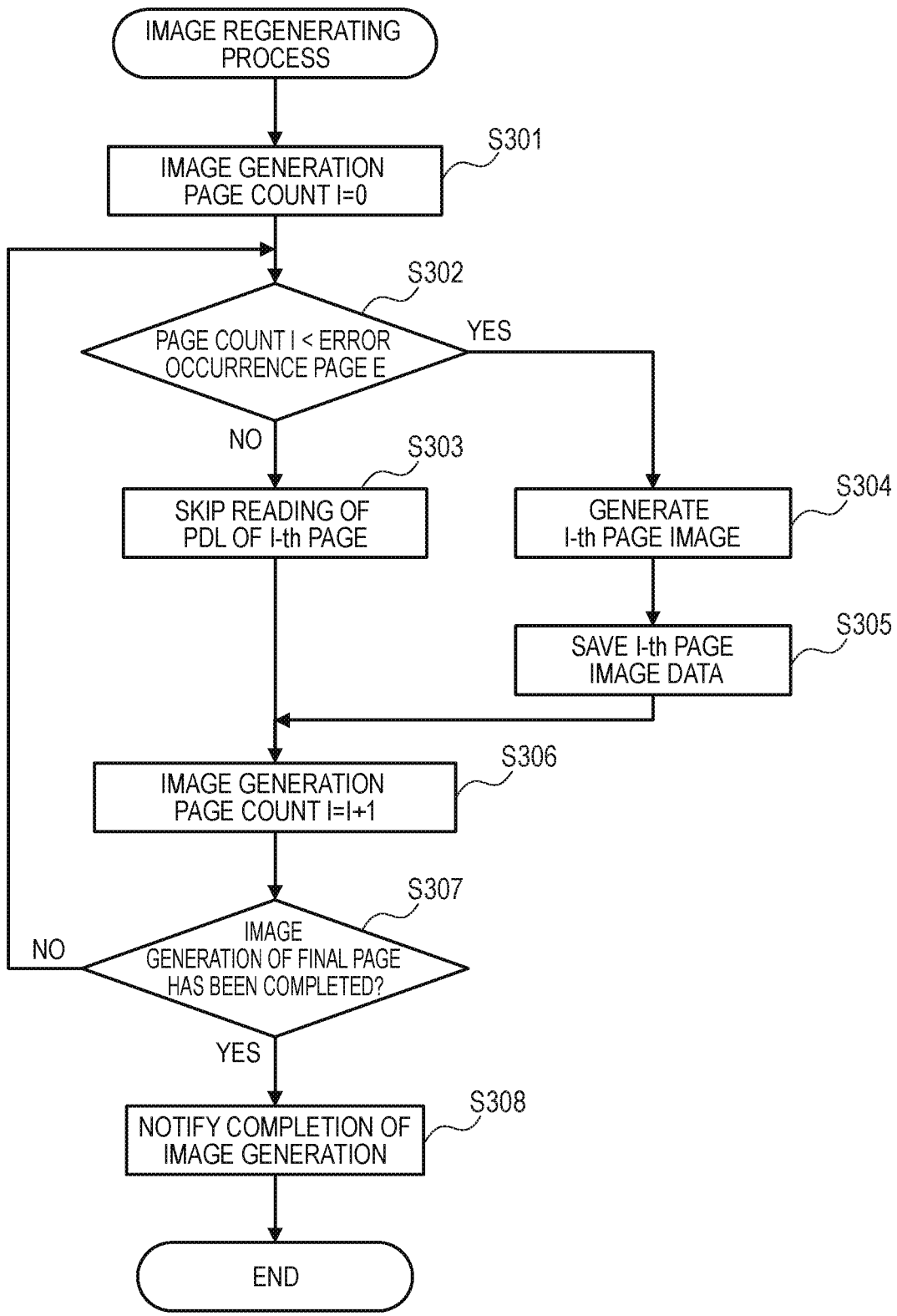
FIG. 8 is a flowchart to illustrate a detailed flow of an image regenerating process.

Then, in S109, the CPU 111 notifies image regeneration start to the image generation module 302 in the program 300, and starts an image regenerating process (image generating process) illustrated in FIG. 8.

Note that, details of the image regenerating process will be described in the flowchart of FIG. 8 described below. Moreover, the flowchart from S109 of the image regenerating process will be illustrated in FIG. 8.

Thereafter, the process returns to S105 again.

FIG. 7 is a flowchart to illustrate the detailed flow of the image generating process of S103 in the flowchart of FIG. 6.

Each process or operation in this flowchart is implemented by the CPU 111 executing the image generation module 302 in the program 300 stored in the ROM 113.

Upon receiving notification of image generation start in S103 described in the flowchart of FIG. 6, first, in S201, the CPU 111 sets such that the image generation page count I=0 in the RAM 112.

Next, in S202, the CPU 111 reads out the PDL data 411 saved in the PDL data management section 410 on the file system 400 which is accessible to the HDD 114, and saves the PDL data in the RAM 112.

Then, after saving the PDL data 411 in the RAM 112, the CPU 111 analyzes the PDL data 411 to create intermediate data of I-th page. Then, the CPU 111 instructs the image processing unit 118 to create image data in bit-map format of I-th page from the intermediate data of I-th page, and to save the image data in the RAM 112.

Next, in S203, the CPU 111 instructs the image processing unit 118 to convert the image data in bit-map format of I-th page, which is saved in the RAM 112, into JPEG format.

Then, the CPU 111 saves the above described image data of Joint Picture Expert Group (JPEG) format in the HDD 114 as the file system 400 stored in the image data management section 420.

In the example of FIG. 4, the image data of the first page is saved in the image data 421 of the image data management section 420, the image data of the second page in the image data 422, and the image data of the third page in the image data 423, respectively.

Note that, when S203 is ended, the process proceeds from S402 to S403 in FIG. 9.

Next, in S204, the CPU 111 adds 1 to the image generation page count I in the RAM 112.

Then, in S205, the CPU 111 confirms whether or not instruction of image generation interruption has been received from the job processing module 301.

When the instruction of image generation interruption has been received, the process proceeds to S208. When the instruction of image generation interruption has not been received, the process proceeds to S206.

Then, when the instruction of image generation interruption has not been received, in S206, the CPU 111 confirms whether or not the analysis of the PDL data 411 has ended and the image data of the final page has been generated.

When the analysis of the PDL data has ended, this flowchart ends. When the analysis of the PDL data 411 has not ended, the process returns to S202.

When the instruction of image generation interruption has been received, in S207, notification of image generation completion is made to the print module 303 in the program 300.

When instruction of image generation interruption has been received in S205, in S208, the CPU 111 discards all the image data 421 to 423 saved in the image data management section 420 on the file system 400 which is accessible to the HDD 114.

Then, when the process of S207 or S208 has ended, the present flowchart ends and the process proceeds to S104 of the flowchart of FIG. 6.

FIG. 8 is a flowchart to illustrate the detailed flow of the image regenerating process of S109 in the flowchart of FIG. 6.

Each process in this flowchart is implemented by the CPU 111 executing the image generation module 302 in the program 300 stored in the ROM 113.

Upon receiving notification of image regeneration start in S109 described in the flowchart of FIG. 6, the process proceeds to S601. Note that since S301 is the process in common with S101 described in the flowchart of FIG. 6, description thereof will be omitted.

In S302, the CPU 111 compares an image generation page count I with an error occurrence page E (to be described later in the flowchart of the printing process of FIG. 9) in the RAM 112.

Then, when the image generation page count I is smaller than the error occurrence page E, the process proceeds to S303.

On the contrary, when the image generation page count I is equal to, or larger than the error occurrence page E, the process proceeds to S304.

When the image generation page count I is smaller than the error occurrence page E, in S303, the CPU 111 analyzes the PDL data 411 of I-th page. However, the CPU 111 skips reading without creating intermediate data of I-th page.

That is, since normal reading has been made for the image data of pages before reaching the error occurrence page E, intermediate data is not created over again.

When the image generation page count I becomes equal to the error occurrence page E, in S304, the CPU 111 reads out the PDL data corresponding to the I-th page from among the PDL data 411 saved as the PDL data management section 410 in the RAM 112.

Then, the CPU 111 analyzes the PDL data 411 which has been read out, and creates intermediate data of I-th page. Moreover, when the image generation page count I is larger than the error occurrence page E as well, the CPU 111 performs substantially the same process in S304.

That is, the CPU 111 performs regeneration of image data for all the pages equal to and after the page where a reading error has occurred.

Note that, here, all of the image data 421 to 423 of the file system 400 recorded in the HDD 114 is discarded.

Next, in S305, the CPU 111 instructs the image processing unit 118 to generate image data in bit-map format of I-th page from the intermediate data of I-th page, and saves the image data in the RAM 112.

Moreover, the CPU 111 instructs the image processing unit 118 to convert the image data in bit-map format of I-th page saved in the RAM 112 into JPEG format. Then, the CPU 111 saves the image data converted into JPEG format in the image data management section 420 on the file system 400 which is accessible to the HDD 114.

In this way, reprinting can be performed by reading out the PDL data temporarily saved in the RAM 112 without requiring image data to a user over again even for a page in which reading error has occurred.

Note that when reading error has occurred caused by a bad sector, the hard disk put a mark indicating a bad sector onto the sector and will not use the sector thereafter. Therefore, reading error due to a bad sector will not occur again even if new data is saved on the file system 400 after an error in reading data has occurred.

In S306, the CPU 111 adds 1 to the image generation page count I in the RAM 112.

Since S307 and S308 are substantially the same process as that until S206 and S207 described in the flowchart of FIG. 7, description thereof will be omitted.

Then, when the process of S308 has ended, this flowchart ends, and the process transits from S411 to S412 in flowchart of FIG. 9.

FIG. 9 is a flowchart to illustrate the detailed flow of the printing process of S104 in the flowchart of FIG. 6.

Each process or operation in this flowchart is implemented by the CPU 111 executing the print module 303 in the program 300 stored in the ROM 113.

Upon receiving notification of print start in S104 described in the flowchart of FIG. 6, first, in S401, the CPU 111 sets such that the print page count P=0 in the RAM 112.

Then, in S402, the CPU 111 confirms whether or not image data of P-th page is present in the image data management section 420 of the file system 400 recorded in the HDD 114.

When the image data of P-th page is present, the process proceeds to S403. When not present, the process returns to S402.

When the image data of P-th page is present in the image data management section 420 of the file system 400 recorded in the HDD 114, in S403, the CPU 111 reads out the saved image data of P-th page to save it in the RAM 112.

Then, in S404, the CPU 111 confirms if reading of the image data of P-th page saved in the image data management section 420 of the file system 400 recorded in the HDD 114 has resulted in an error.

When the reading of the image data of P-th page has normally ended, the process proceeds to S408.

On the other hand, when the reading has not normally ended because a bad sector is included in the image data of P-th page and thus the reading has resulted in an error, the process proceeds to S405.

When the reading has resulted in an error, in S405, the CPU 111 sets such that the error occurrence page E=the print page count P in the RAM 112.

Then, in S406, the CPU 111 discards the image data of P-th page which is saved in the image data management section 420 of the file system 400 recorded in the HDD 114 and in which a reading error has occurred.

Further, in S407, a reading error is notified to the job processing module 301 in the program 300. In S407, upon notification of an error, the process transits from S105 to S108 in the print job process of FIG. 6. In S407, upon notification of reading error, the process returns to S402. In this occasion, in the printing process illustrated in FIG. 9, S402 is repeated until the image regeneration of a page image, which has resulted in a reading error in the image regenerating process of FIG. 8, is performed.

When reading of the image data of P-th page has normally ended, in S408, the CPU 111 instructs the image processing unit 118 to convert the image data in JPEG format saved in the RAM 112 into bit-map format, and saves it in the RAM 112 again.

Here, to print the image data of P-th page, the image data in bit-map format is transferred to a printer 140 via a device I/F 116.

Then, the printer 140 prints the image data of P-th page on recording paper and outputs the printed recording paper.

When the printing of the image data of P-th page has ended, in S409, the CPU 111 discards the image data of P-th page which is saved in the image data management section 420 on the file system 400 which is accessible to the HDD 114.

Then, in S410, the CPU 111 adds 1 to the print page count P in the RAM 112.

Next, in S411, the CPU 111 confirms whether or not notification of image generation completion has been received in S207 described in the flowchart of FIG. 7 or in S308 described in the flowchart of FIG. 8.

Then, when the notification of image generation completion has been received, the process proceeds to S412. And when the notification of image generation completion has not been received, the process returns to S402.

When the notification of image generation completion has been received, in S412, the CPU 111 compares the print page count P with the image generation page count I in the RAM 112.

Then, if the print page count P is equal to the image generation page count I, the process proceeds to S413. If both are different, the process returns to S402.

When the print page count P and the image generation page count I are equal to each other, since printing of all the pages has ended, in S413, the CPU 111 provides notification of print completion to the job processing module 301 in the program 300.

Then, when the process of S413 has ended, this flowchart ends and the process proceeds from S106 to S107 in the flowchart of FIG. 6.

As described so far, according to the first embodiment, even if an error in reading image data occurs due to a bad sector of HDD, reprinting is performed by reading out the PDL data temporarily saved in the RAM 112.

This enables reprinting by an image formation apparatus alone without requiring a user to re-input image data.

Second Embodiment

In the first embodiment, upon occurrence of a reading error, image data is regenerated for all the pages equal to and after the page where the error has occurred. In contrast to this, in the second embodiment, a method in which upon occurrence of a reading error, only the page where the error has occurred is regenerated will be described.

Note that the flows of the image generating process and the printing process of the second embodiment are respectively same as those of the image generating process (FIG. 7) and the printing process (FIG. 9) of the first embodiment. However, the flows of the print job process and the image regenerating process of the second embodiment are different from those of the print job process (FIG. 6) and the image regenerating process (FIG. 8) of the first embodiment.

Figure 10:
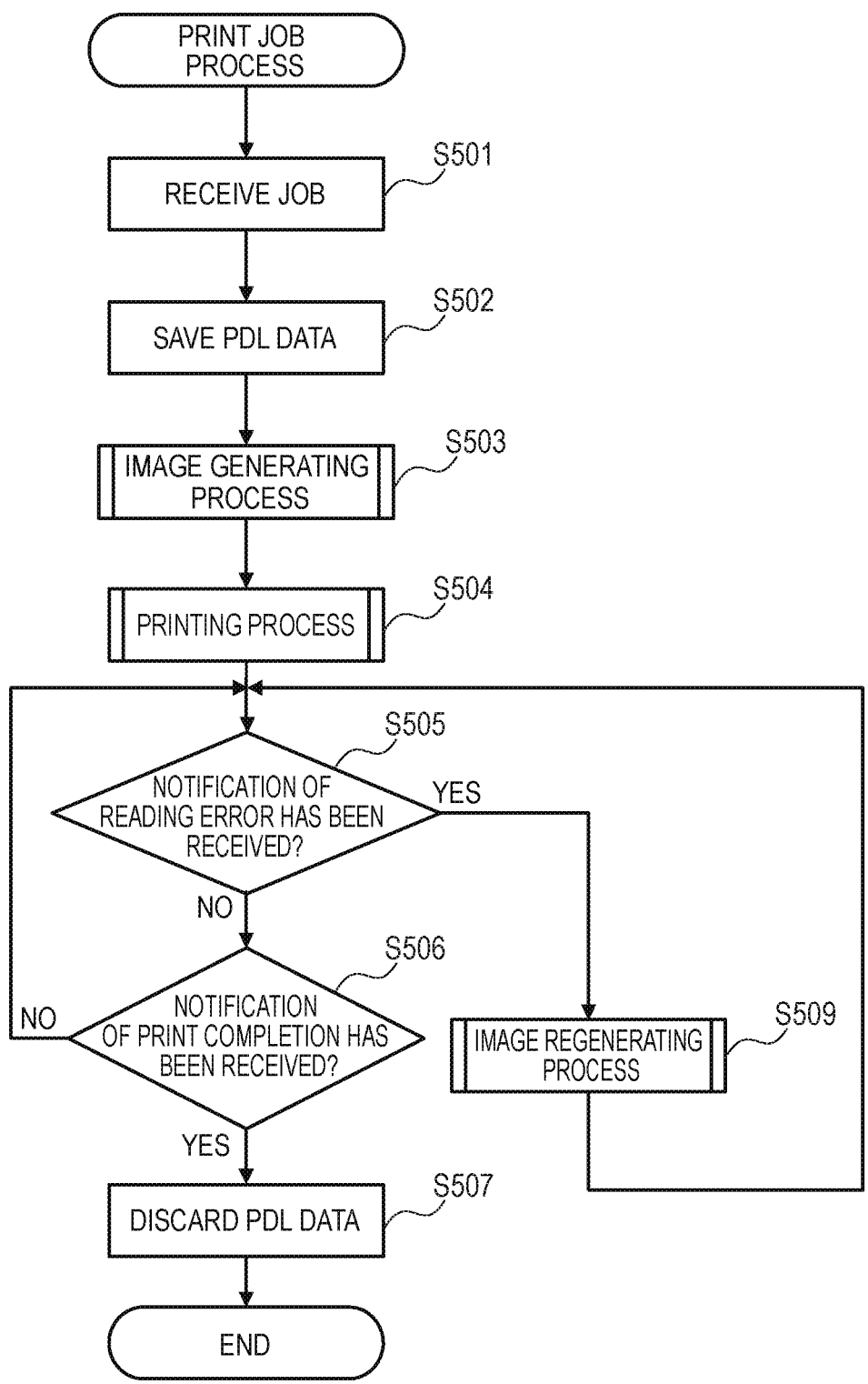
FIG. 10 is a flowchart to illustrate the flow of the print job process according to a second embodiment.

FIG. 10 is a flowchart to illustrate the flow of the print job process of an image formation apparatus according to the second embodiment.

Each process or operation of this flowchart is implemented by the CPU 111 executing the job processing module 301 in the program 300 stored in the ROM 113.

The process from S501 to S507 is substantially same as that from S101 to S107 described in the flowchart of FIG. 6, description thereof will be omitted.

Moreover, since S509 is the process which is substantially same as that of S109 described in the flowchart of FIG. 6, description thereof will be omitted.

However, in the second embodiment in contrast to the first embodiment, there is no notification of image generation interruption corresponding to S108 of the flowchart of FIG. 6.

Figure 11:
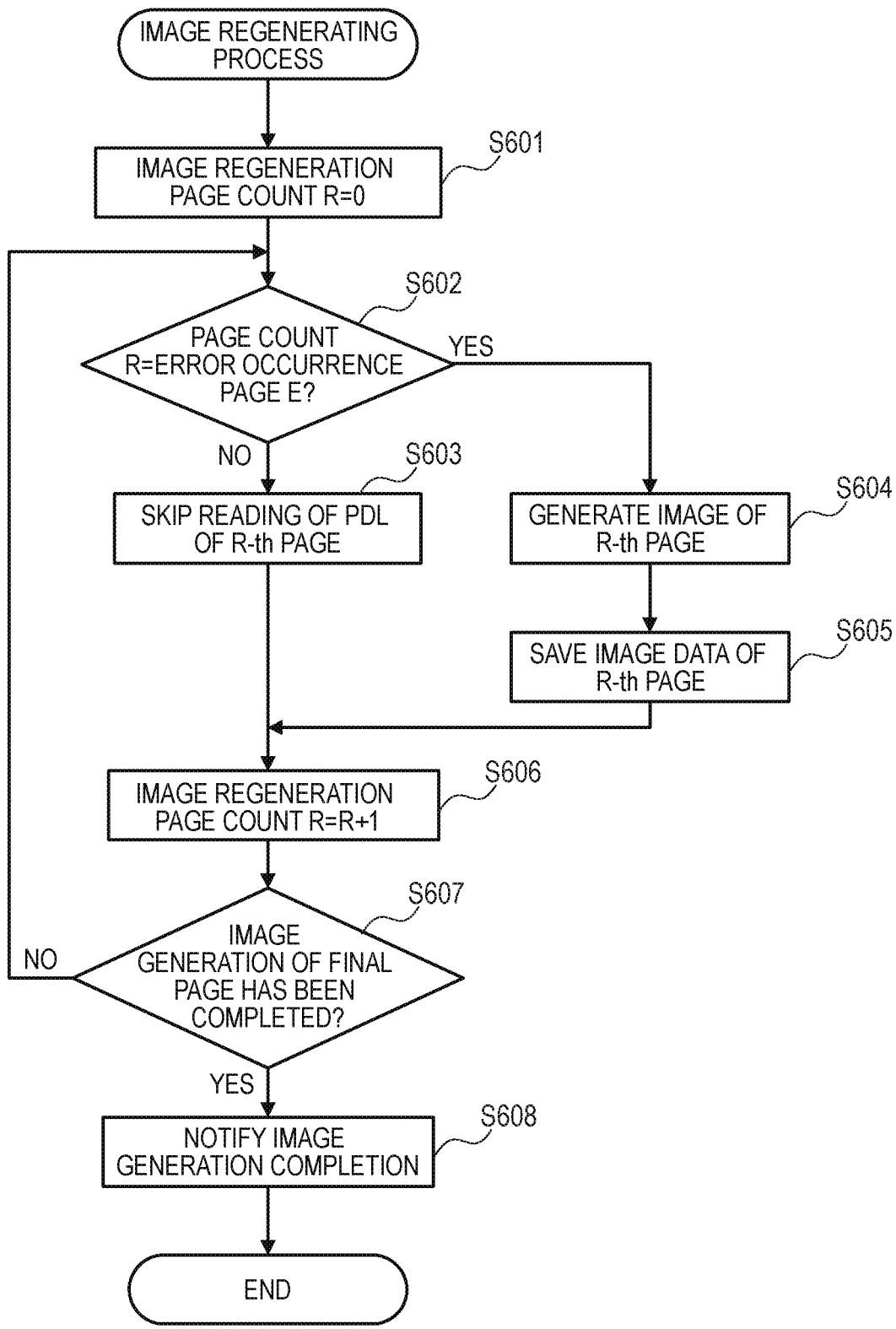
FIG. 11 is a flowchart to illustrate the detailed flow of the image regenerating process according to a second embodiment.

FIG. 11 is a flowchart to illustrate the detailed flow of the image generating process in the flowchart of FIG. 10.

Each process or operation of this flowchart is also implemented by the CPU 111 executing the image generation module 302 in the program 300 stored in the ROM 113.

In the second embodiment, an image regeneration page count R is used in place of the image generation page count I used in the first embodiment.

Since each process from S601 to S608, excepting determination in S602, is basically same as each process from S301 to S308 described in the flowchart of FIG. 8 excepting that the image regeneration page count R is used, detailed description thereof will be omitted.

However, although image data is regenerated for all the pages equal to and after the page E where a reading error has occurred in the first embodiment, image data is regenerated only for the page E where a reading error has occurred in the second embodiment.

Therefore, in the second embodiment, only when the image regeneration page count R is equal to the error occurrence page E, the process proceeds to S604.

Then, in S604, the CPU 111 reads out only the PDL data corresponding to the error occurrence page E out of the PDL data 411 saved in the PDL data management section 410 as the file system 400 in the RAM 112.

Then, the PDL data 411 which has been read out is analyzed to create intermediate data of E-th page. That is, image data is regenerated only for the page E where a reading error has occurred.

Note that in the second embodiment, image date for pages equal to and after E+1-th page will not be discarded, since the image data 421 to 423 of the file system 400 recorded in the HDD 114 is used for the printing process.

Next, in S605, the CPU 111 instructs the image processing unit 118 to create image data in bit-map format of R-th page from the intermediate data of I-th page, and saves the image data in the RAM 112.

Moreover, the CPU 111 instructs the image processing unit 118 to convert the image data in bit-map format of R-th page saved in the RAM 112 into JPEG format. Then, the image data which has been converted into JPEG format is saved in the image data management section 420 on the file system 400 accessible to the HDD 114.

This enables execution of reprinting without requiring a user to re-input image data by reading the PDL data temporarily saved in the RAM 112 even for a page where a reading error has occurred.

Moreover, in the second embodiment, notification of image generation interruption which is performed in S108 in the first embodiment is obviated.

As so far described, according to the second embodiment, as in the first embodiment, even if an error in reading image data occurs due to a bad sector of the HDD, reprinting is performed by reading out the PDL data temporarily saved in the RAM 112. Moreover, according to the second embodiment, in contrast to the first embodiment, the data to be regenerated can be suppressed to a minimum since when an error in reading image data has occurred, image data is regenerated only for the page where the reading error has occurred.

This enables reprinting by an image formation apparatus alone without requiring a user to re-input image data.

Other Embodiments

In each embodiment described above, although an example in which the destination to save the PDL data is the HDD 114 has been described, the disclosure will not be limited to this. The destination to save the PDL data may be, for example, the RAM 112.

Moreover, in each embodiment described above, although an example in which PDL data is included in the print job data which has been input, the disclosure will not be limited to this. The print job data may include, for example, image data such as JPEG and Tagged Image File Format (TIFF).

Further, in each embodiment described above, although an example in which print job data is input from the PC as input data has been described, the disclosure will not be limited to this. The input data may be, for example, image data input from the scanner 130 in the MFP 100, and image data to be sent over by facsimile via a telephone line and the Internet.

Further, in each embodiment described above, although an example in which the place to store programs is the ROM 113 has been described, the disclosure will not be limited to this. The place to store programs may be, for example, the HDD 114.

Further, in the above described embodiments, although the image formation apparatus has been described with the MFP 100 as an example, the disclosure will not be limited to this. For example, the image formation apparatus may be a printer.

The disclosure can also be implemented by a process to provide a program for implementing at least one of the above described embodiments to a system or apparatus via a network or storage medium, and to read out and execute the program by at least one processor in a computer of the system or apparatus. Moreover, it can also be implemented by a circuit (for example, Applications Specific Integrated Circuits (ASIC)) which implement at least one function.

Further, the disclosure may be applied to either a system including a plurality of equipment, or an apparatus including single equipment.

The disclosure will not be limited to the above described embodiments, and various modifications thereof are possible based on the spirit of the present invention, while such modifications will not be excluded from the scope of the present invention. That is, configurations in which each embodiment described above and its modification are combined are all included in the present invention.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-110880, filed Jun. 11, 2018, which is hereby incorporated by reference herein in its entirety.

What is claimed is:

1. An image formation apparatus, comprising:
   a hard disk configured to save print data;
   a controller configured to generate a plurality of image data including first image data and second image data from the print data read out from the hard disk; and
   a printer configured to print the image data on paper,
   wherein
   the hard disk is configured to save the plurality of image data,
   the controller is configured to
      read out the first image data among the plurality of image data from the hard disk, and
      according to occurrence of a reading error in the hard disk of the image data again read out the print data corresponding to the first image data for which the reading error has occurred from the hard disk before reading out the second image data, and generate image data corresponding to the first image data for which the reading error has occurred, based on the print data again read out.

2. The image formation apparatus according to claim 1, wherein the controller is configured to determine whether or not the reading error of the plurality of image data has occurred for each page of a print job.

3. The image formation apparatus according to claim 1, wherein, based on the occurrence of the reading error of the first image data, the controller is configured to read out the print data corresponding to the second image data from the hard disk, and generate image data corresponding to the second image data from the print data which has been read out from the hard disk.

4. The image formation apparatus according to claim 1, wherein, based on the occurrence of the reading error of the first image data, the controller is configured to read out the print job the print data corresponding to the image data for which the reading error has occurred, from the hard disk, and generate only image data corresponding to the first image data from the print data which has been read out from the hard disk but not generate image data corresponding to the second image data.

5. The image formation apparatus according to claim 1, wherein the controller is configured to discard, as the image data read out from the hard disk has been printed by the printer, the image data for which the printing has been executed, from the hard disk.

6. The image formation apparatus according to claim 1, wherein the print data is PDL data.

7. The image formation apparatus according to claim 1, wherein the hard disk is configured to save the print data until a print job corresponding to the print data is completed, and discard the print data when the print job has been completed.

8. The image formation apparatus according to claim 1, wherein the reading error occurs by an abnormality in writing to the hard disk by a magnetic head of the hard disk.

9. The image formation apparatus according to claim 1, wherein the image data corresponding to the first image data is saved in a sector different from a sector of the hard disk in which the first image data has been stored.

10. A method for controlling an image formation apparatus that comprises a hard disk configured to save print data, a controller configured to generate a plurality of image data including first image data and second image data from the print data read out from the hard disk, and a printer configured to print the image data on paper, the method comprising:
    saving the plurality of image data in the hard disk;
    reading out the first image data among the plurality of image data from the hard disk; and
    according to occurrence of a reading error in the hard disk of the image data again reading out the print data corresponding to the first image data for which the reading error has occurred from the hard disk before reading out the second image data, and generating image data corresponding to the first image data for which the reading error has occurred, based on the print data again read out.

11. A non-transitory computer-readable storage medium for storing a program that causes a computer to execute a method for controlling an image formation apparatus that comprises a hard disk configured to save print data, a controller configured to generate a plurality of image data including first image data and second image data from the print data read out from the hard disk, and a printer configured to print the image data on paper, the method comprising:
    saving the plurality of image data in the hard disk;
    reading out the first image data among the plurality of image data from the hard disk; and
    according to occurrence of a reading error in the hard disk of the image data again reading out the print data corresponding to the first image data for which the reading error has occurred from the hard disk before reading out the second image data, and generating image data corresponding to the first image data for which the reading error has occurred, based on the print data again read out.

* * * * *